(12) United States Patent
McDonald et al.

(10) Patent No.: US 7,903,442 B2
(45) Date of Patent: Mar. 8, 2011

(54) APPARATUS AND METHODS FOR POWER CONVERSION

(75) Inventors: Brent McDonald, Round Rock, TX (US); Brian P. Johnson, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 558 days.

(21) Appl. No.: 11/565,620

(22) Filed: Nov. 30, 2006

(65) Prior Publication Data

US 2008/0130339 A1  Jun. 5, 2008

(51) Int. Cl.
*H02M 7/155* (2006.01)
(52) U.S. Cl. ............................. 363/127; 363/8
(58) Field of Classification Search .................. 363/127, 363/8, 10, 124
See application file for complete search history.

(56) References Cited

U.S. PATENT DOCUMENTS

| | | | | |
|---|---|---|---|---|
| 3,339,080 | A * | 8/1967 | Howald | 307/66 |
| 4,255,782 | A * | 3/1981 | Joyce | 363/8 |
| 4,772,994 | A * | 9/1988 | Harada et al. | 363/8 |
| 5,038,266 | A * | 8/1991 | Callen et al. | 363/89 |
| 5,233,509 | A | 8/1993 | Ghotbi | |
| 5,771,168 | A | 6/1998 | Liao et al. | |
| 6,115,267 | A * | 9/2000 | Herbert | 363/25 |
| 6,137,698 | A * | 10/2000 | Yukawa et al. | 363/25 |
| 6,256,209 | B1 * | 7/2001 | Gurwicz et al. | 363/17 |
| 6,411,535 | B1 | 6/2002 | Roux | |
| 6,628,532 | B1 * | 9/2003 | Rinne et al. | 363/21.06 |
| 6,738,274 | B2 | 5/2004 | Prasad et al. | |
| 6,819,089 | B2 | 11/2004 | Deboy et al. | |
| 6,819,575 | B1 | 11/2004 | Batarseh et al. | |
| 6,963,497 | B1 * | 11/2005 | Herbert | 363/25 |
| 6,970,364 | B2 | 11/2005 | Batarseh et al. | |
| 6,987,676 | B2 | 1/2006 | Cheng et al. | |
| 7,042,743 | B2 | 5/2006 | Pidutti et al. | |
| 7,057,375 | B2 | 6/2006 | Czekay et al. | |
| 7,061,779 | B2 | 6/2006 | Yang | |
| 2003/0095423 | A1 | 5/2003 | Hirst | |
| 2004/0233590 | A1 | 11/2004 | Nakagawa et al. | |

(Continued)

FOREIGN PATENT DOCUMENTS

WO   WO 02/089303 A1   11/2002

OTHER PUBLICATIONS

Bing Lu, Ron Brown and Marco Soldano; Bridgeless PFC Implementation Using One Cycle Control Technique, International Rectifier, APEC '05.

(Continued)

*Primary Examiner* — Jeffrey L. Sterrett
*Assistant Examiner* — Manuel Hernandez
(74) *Attorney, Agent, or Firm* — Pramudji, Wendt & Tran, LLP

(57) ABSTRACT

An alternating current (AC) to direct current (DC) power converter comprises a first electrical path in a primary circuit having an inductor coupled in series with a first primary winding and a first switch to a ground connection. A second electrical path in the primary circuit has the inductor coupled in series with a second primary winding and a second switch to the ground connection. A secondary circuit is electromagnetically coupled to the primary circuit. A controller operates the first switch and the second switch in a predetermined manner to induce a current in the secondary circuits.

17 Claims, 5 Drawing Sheets

U.S. PATENT DOCUMENTS

| | | | |
|---|---|---|---|
| 2004/0234050 A1* | 11/2004 | Muller | 379/88.17 |
| 2005/0030772 A1* | 2/2005 | Phadke | 363/71 |
| 2005/0052849 A1* | 3/2005 | Keating et al. | 361/719 |
| 2005/0066210 A1* | 3/2005 | Chen | 713/340 |
| 2005/0162021 A1 | 7/2005 | Jenkins | |
| 2006/0198172 A1 | 9/2006 | Wood | |

OTHER PUBLICATIONS

L. Rossetto, G. Spiazzi, P. Tenti, Control Techniques for Power Factor Correction Converters, University of Padova, Via Gradenigo 6/a, 35131 Padova—Italy.

* cited by examiner

APPARATUS AND METHODS FOR POWER CONVERSION

BACKGROUND

1. Technical Field

This disclosure relates generally to information handling systems and more particularly to electrical power conversion systems.

2. Background Information

As the value and use of information continues to increase, individuals and businesses seek additional ways to process and store information. One option available is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking system.

There is continuous pressure from both domestic and international regulatory bodies to increase the efficiency of power supplies used in information handling systems.

SUMMARY

The following presents a general summary of several aspects of the disclosure in order to provide a basic understanding of at least some facets of the disclosure. This summary is not an extensive overview of the disclosure. It is not intended to identify key or critical elements of the disclosure or to limit the scope of the claims. The following summary merely presents some concepts of the disclosure in a general form as a prelude to the more detailed description that follows.

In one aspect, an alternating current (AC) to direct current (DC) power converter comprises a first electrical path in a primary circuit having an inductor coupled in series with a first primary winding and a first switch to a ground connection. A second electrical path in the primary circuit has the inductor coupled in series with a second primary winding and a second switch to the ground connection. A secondary circuit is electromagnetically coupled to the primary circuit. A controller operates the first switch and the second switch in a predetermined manner to induce a current in the secondary circuit.

In another aspect, a method for converting alternating current to direct current comprises coupling an inductor in a primary circuit in series with a first primary winding and a first switch to a ground connection. The inductor is also coupled in the primary circuit in series with a second primary winding and a second switch to the ground connection. The first switch and the second switch are controlled in a predetermined manner to induce a current through a secondary circuit when an alternating current flows through the primary circuit.

In yet another aspect, an information handling system comprises a processor. A power converter is coupled to the processor for providing power thereto. The power converter comprises a first electrical path in a primary circuit having an inductor coupled in series with a first primary winding and a first switch to a ground connection. A second electrical path in the primary circuit has the inductor coupled in series with a second primary winding and a second switch to the ground connection. A secondary circuit is electromagnetically coupled to the primary circuit. A controller operates the first switch and the second switch in a predetermined manner to induce a current in the secondary circuit.

Another aspect of the present disclosure provides for an alternating current (AC) to direct current (DC) power converter. The power converter includes a first electrical path in a primary circuit having an inductor coupled in series with a first primary winding and a first switch to a ground connection. A second electrical path in the primary circuit has the inductor coupled in series with a second primary winding and a second switch to the ground connection. A secondary circuit is electromagnetically coupled to the primary circuit. Furthermore, the power converter includes a controller a controller configured to activate the first switch and the second switch during a first time interval and de-activate one of the first switch and the second switch in a second time interval after the first time interval to induce a current in the secondary circuit when an alternating current flows through the primary circuit.

A further aspect of the present disclosure provides for a method for converting alternating current to direct current. The method includes coupling an inductor in a primary circuit in series with a first primary winding and a first switch to a around connection. The method also includes coupling the inductor in the primary circuit in series with a second primary winding and a second switch to the ground connection. Furthermore, the method also includes activating the first switch and the second switch during a first time interval and de-activating one of the first switch and the second switch in a second time interval after the first time interval to induce a current through a secondary circuit when an alternating current flows through the primary circuit.

Yet another aspect of the present disclosure provides for an information handling system. The information handling system includes a processor. A power converter is coupled to the processor for providing power thereto. The power converter comprises a first electrical path in a primary circuit having an inductor coupled in series with a first primary winding and a first switch to a ground connection. A second electrical path in the primary circuit has the inductor coupled in series with a second primary winding and a second switch to the around connection. A secondary circuit is electromagnetically coupled to the primary circuit. Furthermore, the power converter includes a controller a controller configured to activate the first switch and the second switch during a first time interval and de-activate one of the first switch and the second switch in a second time interval after the first time interval to induce a current in the secondary circuit when an alternating current flows through the primary circuit.

BRIEF DESCRIPTION OF THE DRAWINGS

For detailed understanding of the illustrative embodiments, reference should be made to the following detailed description, taken in conjunction with the accompanying drawings, in which like elements have been given like numerals, wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may comprise a personal computer, a network storage device, a network server, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more communication buses operable to transmit communications between the various hardware components. In addition, an information handling system may include a power supply for converting an input alternating current power to direct current power for use by the components of the information handling system.

Electronic equipment, which may be an information handling system, requires a source of electrical power. Input power to the electronic equipment may be an alternating current (AC) power that may require conversion to a direct current (DC) power having at least one DC voltage at a level usable by the electronic equipment.

Most electronic equipment having substantial power requirements draw power from an alternating current (AC) line source. An AC voltage drawn therefrom may not be directly useable by the electronic equipment. The AC voltage may be converted to a direct current (DC) voltage by an AC-to-DC converter. Most electronic equipment may require one or more DC voltage magnitudes. The different DC voltage magnitudes are subsequently provided by a DC-to-DC converter coupled to an output of the AC-to-DC converter. Switch mode power supplies are commonly used in information handling systems and other electronic equipment. Many embodiments of switch-mode power supplies utilize rectifier bridge diodes that cause unwanted power dissipation due to their inherent forward voltage bias that adversely affects conversion efficiency of the power supplies.

Figure 1:
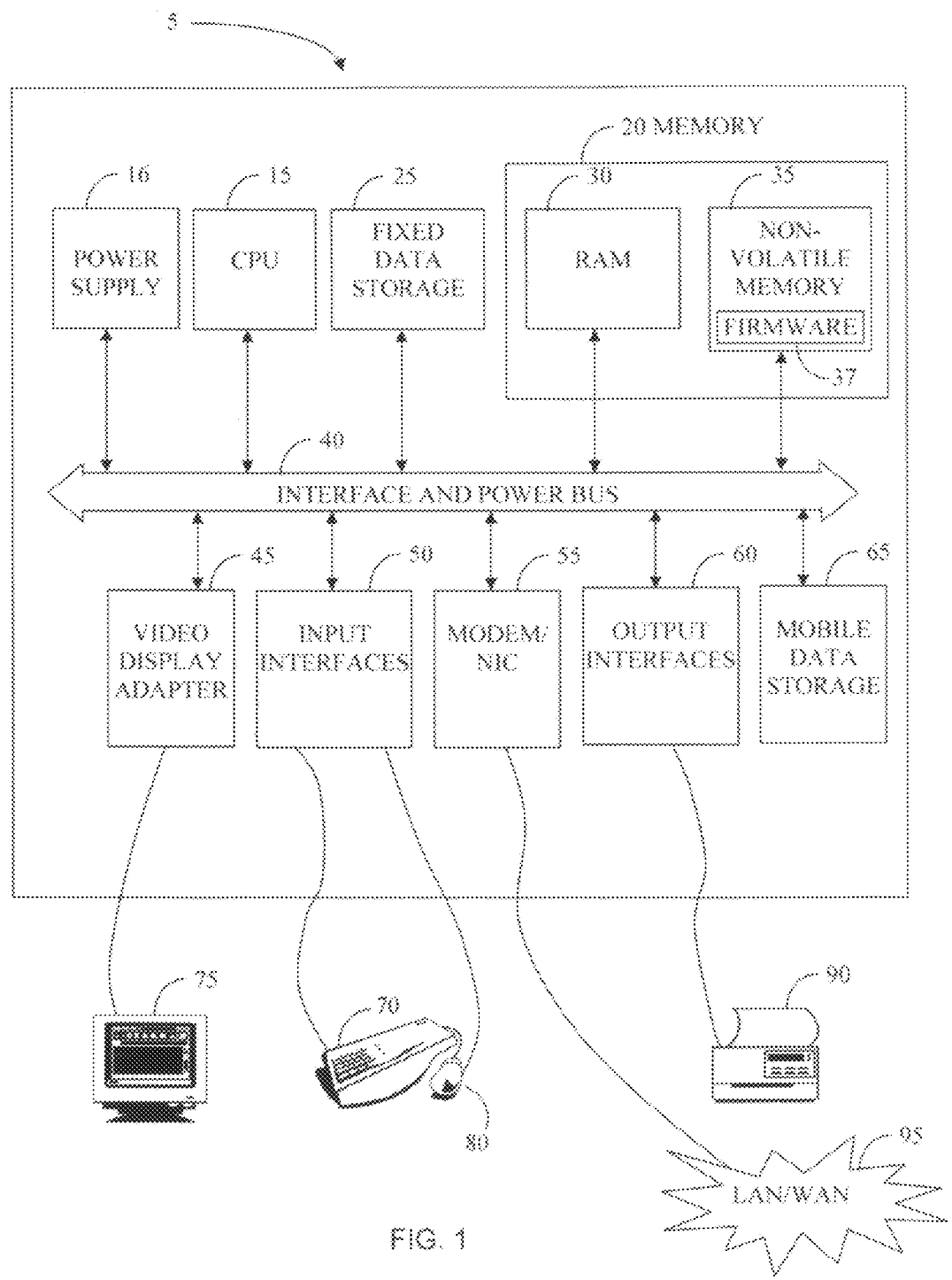
FIG. 1 is a block diagram of an information handling system.

Referring to FIG. 1, in a non-limiting example, an information handling system 5, according to one aspect, comprises a power supply 16, also called a power converter. Power supply 16 is connected to other components of the information handling system through interface and power bus 40. Power supply 16 may be a switch mode power supply. Interface and power bus 40 is shown herein as a single bus for simplicity but may comprise separate electrical conduction paths for data communication and power. For example, power may be transmitted to various components through cables (not shown) connected between the power supply and various components. Likewise, multiple conductors may be used for data communication.

CPU 15 may be a processor, microprocessor, minicomputer, or any other suitable device, for executing programmed instructions. CPU 15 may comprise a plurality of such processors, microprocessors, minicomputers, and other devices. CPU 15 may be in data communication over interface and power bus 40 with fixed data storage 25 and memory 20.

Memory 20 comprises non-volatile memory 35 having a firmware program 37, such as an initialization start-up program, stored therein. Non-volatile memory includes, but is not limited to flash memory and electrically erasable programmable read-only memory (EEPROM). The firmware program 37 may contain, for example, all the programming instructions required to control, for example, a keyboard 70, a display monitor 75, a mouse 80, a mobile data storage 65, other input/output devices not shown here, and a number of miscellaneous functions and/or devices. Memory 20 may also comprise a random access memory (RAM) 30. The OS and application programs may be loaded into RAM 30 for execution. RAM 30 may be volatile memory such that data in RAM 30 is typically lost when power is removed.

Fixed data storage device 25 may be used to store the OS, application programs, and other data for use by IHS 5. A fixed data storage device refers to non-volatile storage devices including permanent and/or semi-permanent storage devices. Fixed data storage devices may include but are not limited to, a hard disk drive (HDD) and a magnetic tape drive. In addition, a mobile data storage device 65 may interface with local interface and power bus 40 for transferring data to and/or from IHS 5. Examples of mobile data storage include, but are not limited to: an external portable hard drive; a solid state semiconductor storage device, such as flash memory; and an optical disc storage device, such as a compact disc (CD) and/or a DVD.

IHS 5 may further comprise a video display adapter 45, a plurality of input interfaces 50, a modem/network interface card (NIC) 55, and a plurality of output interfaces 60. Output interface 60 may transmit data to printer 90 for printing.

IHS 5 may be coupled to an external network 95 through NIC 55 thus allowing the IHS 5 to send and receive data via the external network 95 to and from a remote device. As shown, the external network 95 may be a local area network (LAN), a wide area network (WAN), including the internet, or any other similar network. As described in FIG. 1, IHS 5 may operate as a personal computer, a network storage device, a network server, or any other enabled information handling device. The personal computer may be a desktop computer, a laptop computer, or a notebook computer.

Figure 2:
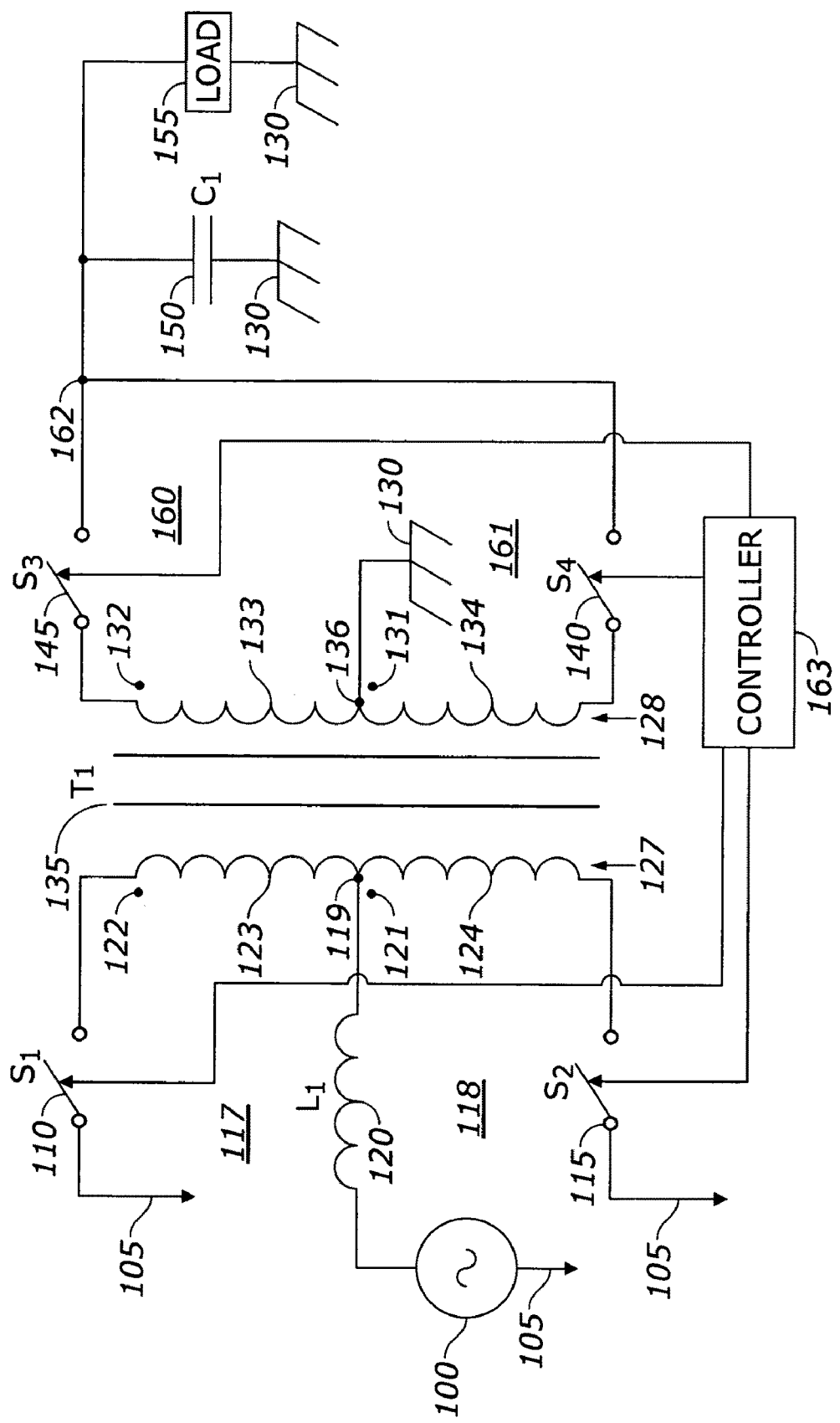
FIG. 2 is a schematic diagram depicting a non-limiting example of a circuit for converting AC power to DC power.

FIG. 2 is a schematic diagram of one non-limiting embodiment of circuit 116 which makes up a portion of power supply 16 in a switch mode power supply configuration. As shown, AC source 100 is connected between ground 105 and inductor 120. Inductor 120 is connected to a center tap 119 of primary winding 127 of transformer 135. Primary winding 127 has a first primary winding 123 and a second primary winding 124. First primary winding 123 and second primary winding 124 may be individual windings coupled to a central conductor, or they may be integral portions of a single winding with a center tap 119.

The present disclosure is not intended to be limited to any particular type of inductor. Rather, an inductor will be selected for the particular design criteria as it relates to the ultimate end use of the circuits disclosed. Thus, it is believed that one of ordinary skill in the art will be able to select an appropriate inductor for incorporation into the circuits of this disclosure.

In a first electrical path 117, first primary winding 123 is coupled in series through first switch $S_1$ to the return path to source 100 through ground 105. Likewise, in a second electrical path 118, second primary winding 124 is coupled in series through second switch $S_2$ to the return path to source 100 through ground 105. AC source 100 and inductor 120 are common to both first electrical path 117 and second electrical path 118.

On the secondary side of transformer 135, secondary winding 128 comprises first secondary winding 133 and second secondary winding 134. The number of coil turns of secondary winding 128 may be the same as, or different than, the number of windings of primary winding 127 as required for the desired output voltage $V_o$.

The transformer windings 123, 124, 133, and 134 are wound and oriented according to the dot convention as indicated by dots 121, 122, 131 and 132. As one skilled in the art will appreciate, current going into a dot (either dot) on a winding on one side of the transformer electromagnetically induces current to come out of a dot in a corresponding winding on the other side of the transformer. In addition, current going into a dot of a winding on one side of the transformer electromagnetically induces a positive voltage at a dot in a winding on the other side of the transformer. As a corollary, current going out of a dot on a winding on one side of the transformer electromagnetically induces a positive voltage at an end of a winding away from the dot on the other side of the transformer. As used with respect to the dot convention, "into" means current flowing from the dot toward the inductor, and conversely "out" meaning from the inductor toward the dot.

In first secondary circuit 160, center tap 136 is coupled to local ground 130. First secondary winding is coupled between center tap 136 and third switch $S_3$. Third switch $S_3$ is coupled to node 162. Similarly, in second secondary circuit 161, second secondary winding 134 is coupled between center tap 136 and fourth switch $S_4$. Fourth switch $S_4$ is coupled to node 162. Node 162 is connected in parallel to bulk capacitor 150 and load 155. Local ground 130 is shown different than ground 105 to indicate that local ground 130 may be isolated from ground 105.

Controller 163 is coupled to switches $S_1$-$S_4$ and controls the operation of the switches according to logic in the controller. This logic may be implemented using hardware, software, firmware, or any combination thereof. Switches $S_1$-$S_4$ may be controlled in such a manner to wave shape the input current to also enhance power factor correction. A number of control techniques are known in the art. These include, but are not limited to: peak current control; average current control; hysteresis control; discontinuous current pulse width modulation control; and flyback control. Commercial devices are available to implement these control techniques. The present disclosure is not intended to be limited to any particular type of control technique. Rather, a controller will be selected for the particular design criteria as it relates to the ultimate end use of the circuits disclosed. Thus, it is believed that one of ordinary skill in the art will be able to select an appropriate controller for incorporation into the circuits of this disclosure.

In one non-limiting embodiment, switches $S_1$ and $S_2$ may each be a semiconductor device including, but not limited to: a field effect transistors (FET), including a junction field effect transistor (JFET); a metal oxide semiconductor field effect transistor (MOSFET); or any other suitable semiconductor device suitable for switching. Likewise, switches $S_4$ and $S_3$ may each be a semiconductor device including, but not limited to: a FET, a JFET, a MOSFET, or a suitable diode.

MOSFETs are well known for their use in power supplies. The present disclosure is not intended to be limited to any particular type of MOSFET. Rather, the MOSFETs will be selected for the particular design criteria as it relates to the ultimate end use of the circuits disclosed. Thus, it is believed that one of ordinary skill in the art will be able to select an appropriate MOSFET for incorporation into the circuits of this disclosure.

Figure 3:
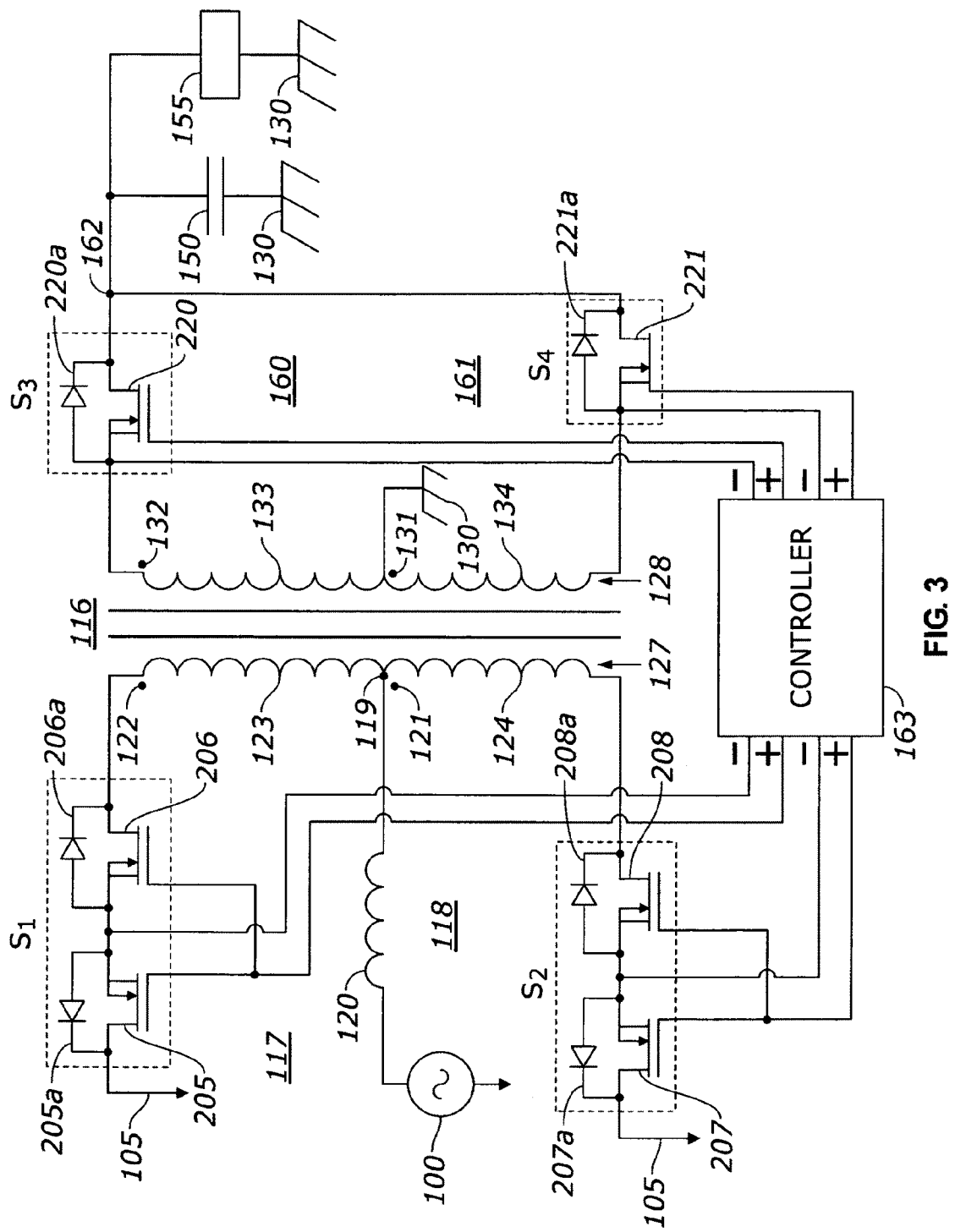
FIG. 3 is a schematic diagram depicting another non-limiting example of a circuit for convert AC power to DC power.

Now, also referring to FIG. 3, one non-limiting example of circuit 116 is shown wherein switches $S_1$ and $S_2$ comprise MOSFET devices. Switch $S_1$ comprises back to back MOSFETs 205 and 206 and their associated body diodes 205a and 206a, respectively. The body diode is inherent in the MOSFET switch and allows the device to only block current in one direction. In order to block current in both directions, the back to back arrangement shown may be used. Switch $S_2$ is configured similar to switch $S_1$. In switch $S_2$, back to back MOSFETS 207 and 208 have corresponding body diodes 207a and 208a, respectively. The use of MOSFETS as switches provides substantially lossless switching. As used herein, the switches are turned "on", also called activated, to be conductive, and turned "off", also called de-activated, to be non-conductive.

As shown in FIG. 3, switches $S_4$ and $S_3$ comprise MOSFETs 220 and 221 having associated body diodes 220a and 221a, respectively. As indicated previously, controller 163 is coupled to switches $S_1$, $S_2$, $S_3$ and $S_4$ to control the operation of the switches according to logic stored in controller 163.

Figure 4:
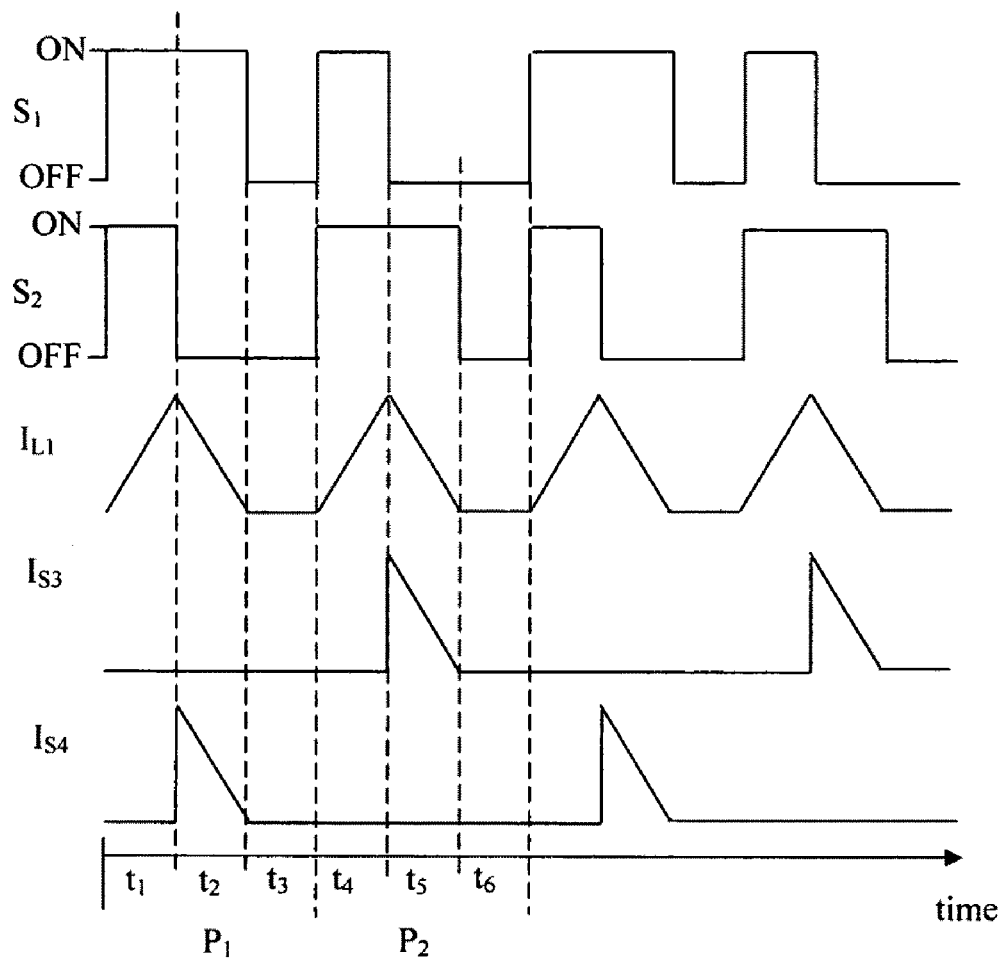
FIG. 4 is a chart depicting switch timing and predicted associated circuit current waveforms for a discontinuous conduction mode control scheme.
Figure 5:
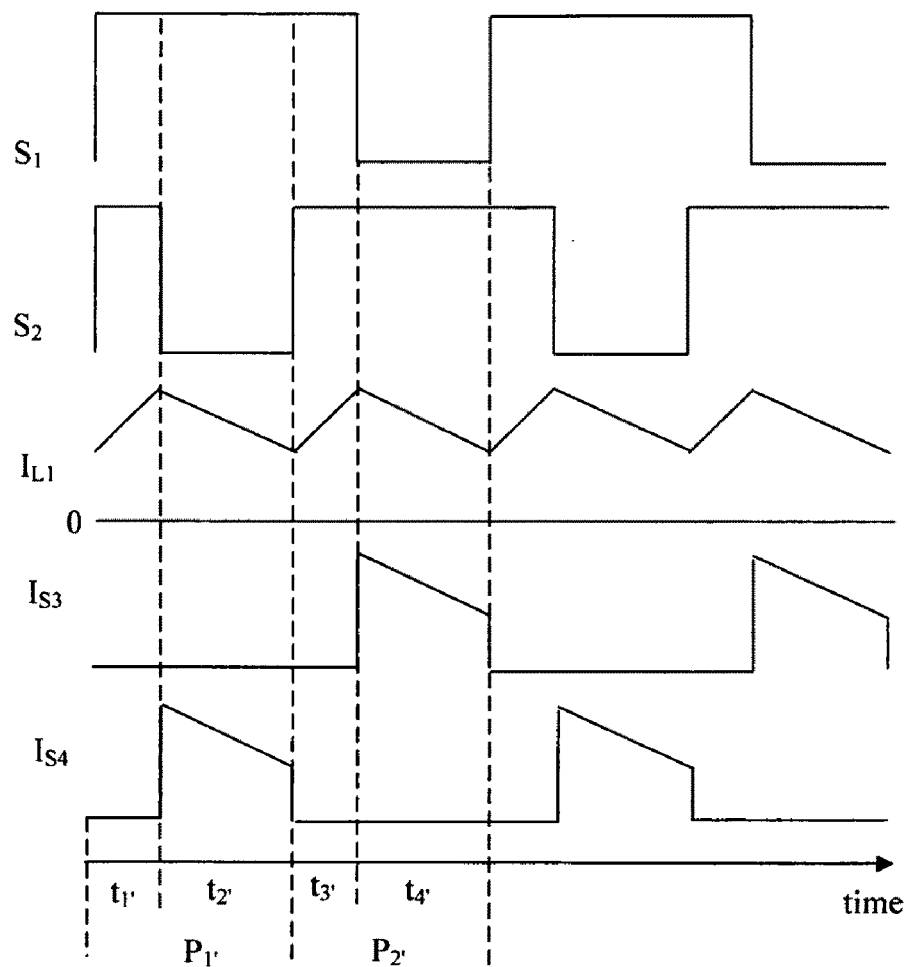
FIG. 5 is a chart depicting switch timing and predicted associated circuit current waveforms for a continuous conduction mode control scheme.

Referring also to FIGS. 4 and 5, wherein FIG. 4 shows a chart depicting switch timing and predicted associated circuit current waveforms vs. time for a non-limiting example of a discontinuous conduction mode control scheme. Similarly, FIG. 5 shows a chart depicting switch timing and predicted associated circuit current waveforms vs. time for a non-limiting example of a continuous conduction mode control scheme. It is noted that FIGS. 4 and 5 show the results only for a positive AC voltage. Current polarities are reversed for negative AC voltage.

In one non-limiting operating example of circuit 116, a discontinuous conduction mode (DCM) switch timing as shown in FIG. 4, is used. Initially, switches $S_1$ and $S_2$ are simultaneously turned on during time interval $t_1$ of period $P_1$ creating a short across primary winding 127 so that the center tap 119 is substantially grounded. Current from AC source 100 flows through the conduction paths to ground. Current is stored in inductor 120 as $I_L$ and ramps up as shown. Time interval $t_1$ is controlled by controller 163 to allow the current stored in inductor 120 to reach a predetermined value. At the beginning of time interval $t_2$, switch $S_2$ is turned off. The conduction path is from inductor 120 through first primary coil 123 through switch $S_1$ to ground 105. This causes the current from $L_1$ to flow out of the dot 122 on first primary winding 123. According to the dot convention, a positive voltage is induced at an end away from a dot in secondary winding 128. This can only occur in the second secondary winding 134 at the end away from dot 131. Current then flows through $S_4$ to load 160. This discharge happens during time interval $t_2$ resulting in the indicated current pulse in the $I_{S4}$ curve. It is noted that in the DCM system, all of the energy stored in inductor 120 is discharged by the end of time interval $t_2$. After time interval $t_2$, $S_1$ is also turned off and both switches remain off for time interval $t_3$ during which there is no current pulse induced in the secondary side of circuit 116.

During time period $P_2$, switches $S_1$ and $S_2$ are turned on during time interval $t_4$ storing current $I_L$ in inductor 120. Time interval $t_4$ is controlled by controller 163 to allow the current stored to reach a predetermined value. Switch $S_1$ is turned off at the beginning of time interval $t_5$. That causes the current from $L_1$ to flow into the dot 121 on the second primary winding 124. This induces a positive voltage at a dot in secondary winding 128. This can only occur in the first secondary winding 133 at corresponding dot 132. Current then flows through $S_3$ to load 160. At the end of time interval $t_5$, $S_2$ is also turned off and both switches remain off for time interval $t_6$ during which there is no current pulse induced in the secondary side of circuit 116. The periods $P_1$ and $P_2$ may be repeated at hundreds to thousands of cycles per second by operation of controller 163. The relative values of the time increments $t_1$ to $t_6$ may be adjusted as required to appropriately shape the current flow to load 160.

As indicated previously, switches $S_3$ and $S_4$ may be controlled by controller 163 to operate at the appropriate times to provide substantially lossless transmission of the currents through the current paths in the secondary circuit. Alternatively, switches $S_3$ and $S_4$ may be diodes acting as synchronous rectifiers such that a suitable positive voltage from the secondary winding will pass through the switches.

In another non-limiting example, referring also to FIG. 5, circuit 116 is operated in continuous conduction mode (CCM). The operation of the circuit elements is substantially the same as described above in relation to DCM operation. However, the timing of the switches varies from that of the DCM operation. As seen in FIG. 5, there are two time intervals in each period. For example, in $P_{1'}$, both $S_1$ and $S_2$ are closed during time interval $t_{1'}$, resulting in a ramp up of current $I_{1'}$ in inductor 120. At the start of time interval $t_{2'}$, $S_2$ is turned off. The current from inductor 120 is discharged through first electrical path 117 and induces current through $S_4$ as described above. Similarly, during $P_{2'}$, the current in second electrical path 118 induces current through $S_3$.

Several variables, including the size of inductor 120, the length of periods $P_{1'}$, $P_{2'}$ and the lengths of $t_{1'}$, $t_{2'}$, $t_{3'}$ and $t_{4'}$ may be adjusted such that inductor 120 never fully discharges. This results in the current $I_{L1'}$ maintaining a sawtooth pattern above a zero level, as shown in FIG. 5.

The circuits described above result in the conversion of AC power to DC power without the power losses associated with bridge rectifiers, resulting in an estimated efficiency improvement of 1-2%.

While the above disclosure has been described in relation to supplying power to an information handling system, it will be apparent that the circuits described may be used in power converters for any application utilizing switch mode power conversion. Examples of such applications include, but are not limited to: consumer electronics such as television sets and audio equipment; and printers.

While various embodiments have been shown and described, various modifications and substitutions may be made thereto without departing from the scope of the disclosure. Accordingly, it is to be understood that the examples of this disclosure have been presented by way of illustrations and not limitation.

What is claimed is:

1. An alternating current (AC) to direct current (DC) power converter, comprising:
    a first electrical path in a primary circuit having an inductor coupled in series with a first primary winding and a first switch to a ground connection;
    a second electrical path in the primary circuit having the inductor coupled in series with a second primary winding and a second switch to the ground connection;
    a secondary circuit electromagnetically coupled to the primary circuit; and
    a controller configured to activate the first switch and the second switch during a first time interval and de-activate one of the first switch and the second switch in a second time interval after the first time interval to induce a current in the secondary circuit when an alternating current flows through the primary circuit, wherein the first switch comprises back to back MOSFETs operable to block current in more than one direction.

2. The power converter of claim 1, wherein the second switch comprises a semiconductor device.

3. The power converter of claim 2, wherein the semiconductor device is chosen from the group consisting of: a field effect transistor (FET); a junction field effect transistor (JFET); and a metal oxide semiconductor field effect transistor (MOSFET).

4. The power converter of claim 1, further comprising a third switch and a fourth switch in the secondary circuit.

5. The power converter of claim 4, wherein each of the third switch and the fourth switch comprise a semiconductor device.

6. The power converter of claim 5, wherein the semiconductor device is chosen from the group consisting of: a field effect transistor (FET); a junction field effect transistor (JFET); a metal oxide semiconductor field effect transistor (MOSFET); and a diode.

7. The power converter of claim 1, wherein the controller operates in a discontinuous conduction mode.

8. The power converter of claim 1, wherein the controller operates in a continuous conduction mode.

9. A method for converting alternating current to direct current, comprising:
    coupling an inductor in a primary circuit in series with a first primary winding and a first switch to a ground connection;
    coupling the inductor in the primary circuit in series with a second primary winding and a second switch to the ground connection; and
    activating the first switch and the second switch during a first time interval and de-activating one of the first switch and the second switch in a second time interval after the first time interval to induce a current through a secondary circuit when an alternating current flows through the primary circuit, wherein the first switch comprises back to back MOSFETs operable to block current in more than one direction.

10. The method of claim 9, wherein the second switch comprises a semiconductor device.

11. The method of claim 9, wherein the semiconductor device is chosen from the group consisting of: a field effect transistor; a junction field effect transistor; and a metal oxide semiconductor field effect transistor.

12. The method of claim 9, wherein controlling the first switch and the second switch in a predetermined manner to induce a current through the secondary circuit comprises controlling the first switch and the second switch to operate in a discontinuous conduction mode.

13. The method of claim 9, wherein controlling the first switch and the second switch in a predetermined manner to induce a current through the secondary circuit comprises controlling the first switch and the second switch to operate in a continuous conduction mode.

14. An information handling system, comprising:
a processor;
a power converter coupled to the processor for providing power thereto, the power converter comprising:
   a first electrical path in a primary circuit having an inductor coupled in series with a first primary winding and a first switch to a ground connection;
   a second electrical path in the primary circuit having the inductor coupled in series with a second primary winding and a second switch to the ground connection;
   a secondary circuit electromagnetically coupled to the primary circuit; and
   a controller configured to activate the first switch and the second switch during a first time interval and deactivate one of the first switch and the second switch in a second time interval after the first time interval to induce a current in the secondary circuit when an alternating current flows through the primary circuit, wherein the first switch comprises back to back MOSFETs operable to block current in more than one direction.

15. The power converter of claim 14, wherein the second switch comprises a semiconductor device.

16. The power converter of claim 15, wherein the semiconductor device is chosen from the group consisting of: a field effect transistor (FET); a junction field effect transistor (JFET); and a metal oxide semiconductor field effect transistor (MOSFET).

17. The power converter of claim 14 further comprising a third switch and a fourth switch in the secondary circuit, wherein each of the third switch and the fourth switch comprise a semiconductor device.

* * * * *